United States Patent [19]
Hutchens et al.

[11] Patent Number: 5,619,426
[45] Date of Patent: Apr. 8, 1997

[54] FLEXIBLE MODULAR SIGNAL PROCESSOR FOR INFRARED IMAGING AND TRACKING SYSTEMS

[75] Inventors: Vernon F. Hutchens, Hermosa Beach; Spencer W. White, Los Angeles, both of Calif.

[73] Assignee: Hughes Electronics, Los Angeles, Calif.

[21] Appl. No.: 491,035

[22] Filed: Jun. 16, 1995

[51] Int. Cl.$^6$ .................................................. F41G 5/00
[52] U.S. Cl. ............................................ 364/516; 342/53
[58] Field of Search ........................... 364/516; 250/332, 250/342; 345/207; 342/53; 370/58.1, 61; 359/245

[56] References Cited

U.S. PATENT DOCUMENTS

| | | | |
|---|---|---|---|
| 4,991,109 | 2/1991 | Crookshanks | 345/207 |
| 5,449,907 | 9/1995 | McKeeman et al. | 250/332 |

*Primary Examiner*—Emanuel T. Voeltz
*Assistant Examiner*—Thomas Peeso
*Attorney, Agent, or Firm*—Gordon R. Lindeen, III; Wanda K. Denson-Low

[57] ABSTRACT

A modular signal processing architecture adapted for use with a focal plane array of detectors. The inventive architecture includes an analog signal processing module (42) for adjusting signals from the focal plane array (12). A nonuniformity correction module (44) provides signal adjustment parameters to the analog signal processing module (42) for each of the detectors in the array (12). A control module (80) provides control signals to each of the modules in the system as required for a desired system configuration. In a specific embodiment, the control signals are communicated via programmable registers on each module. Software running on the system control module provides the control signals to the programmable registers to reconfigure the system in response to the addition of modules thereto. Hence, additional modules may be easily incorporated into the system without a costly redesign of same. In the illustrative embodiment, each of the modules is connected to a common bus via a backplane connector (90). Optional add-on modules, for the purpose of illustration, include a frame memory module (79), an output processor module (82) and a scene based nonuniformity correction module (81). The novel modular design of the signal processing architecture of the present invention is facilitated by the unique design of the analog processing module (42) which includes a sample and hold multiplexer (100) for simultaneously sampling a plurality of parallel inputs from the focal plane array (12) and subsequently multiplexing the inputs onto a single analog path.

18 Claims, 7 Drawing Sheets

FLEXIBLE MODULAR SIGNAL PROCESSOR FOR INFRARED IMAGING AND TRACKING SYSTEMS

BACKGROUND OF THE INVENTION

1. Field of Invention

This invention relates to signal processors. Specifically the present invention relates to processors used for receiving, processing, and displaying signals for infrared imaging systems and tracking devices.

2. Description of the Related Art

Infrared imaging and tracking systems are used in a variety of applications ranging from monitoring ocean temperature patterns to guiding heat seeking missiles. These systems contain heat sensors for detecting thermal energy and electronics for processing resulting thermal patterns.

Certain features such as special stabilization modes, contrast enhancement, and electronic zoom may be required for some applications and not required for others. Accordingly, any special requirements were typically met by custom designing and building the signal processing circuitry. This was expensive due to the labor cost of the custom design and assembly and the parts cost.

Hence, a need exists in the art for a versatile, flexible signal processing architecture for infrared sensors which may be inexpensively optimized for a particular application.

SUMMARY OF THE INVENTION

The need in the art is addressed by the modular signal processing architecture of the present invention. In the illustrative embodiment, the inventive architecture is adapted for use with a focal plane array of detectors and includes an analog signal processing module for adjusting signals from the focal plane array. A nonuniformity correction module provides signal adjustment parameters to the analog signal processing module for each of the detectors in the array. A control module provides control signals to one or more of the modules in the system. The control signals are communicated to each of the modules as required for a desired system configuration.

In a specific embodiment, the control signals are communicated via programmable registers on each module. Software running on the system control module provides the control signals to the programmable registers to reconfigure the system in response to the addition of modules thereto. Hence, additional modules may be easily incorporated into the system without a costly redesign of same.

In the illustrative embodiment, each of the modules is connected to a common bus via a backplane connector. Optional add-on modules, for the purpose of illustration, include a frame memory module, an output processor module and a scene based nonuniformity correction module.

The novel modular design of the signal processing architecture of the present invention is facilitated by the unique design of the analog processing module which includes a sample and hold multiplexer (SHMUX) for simultaneously sampling a plurality of parallel inputs from the focal plane array and subsequently multiplexing the inputs onto a single analog path.

DESCRIPTION OF THE INVENTION

Figure 1:
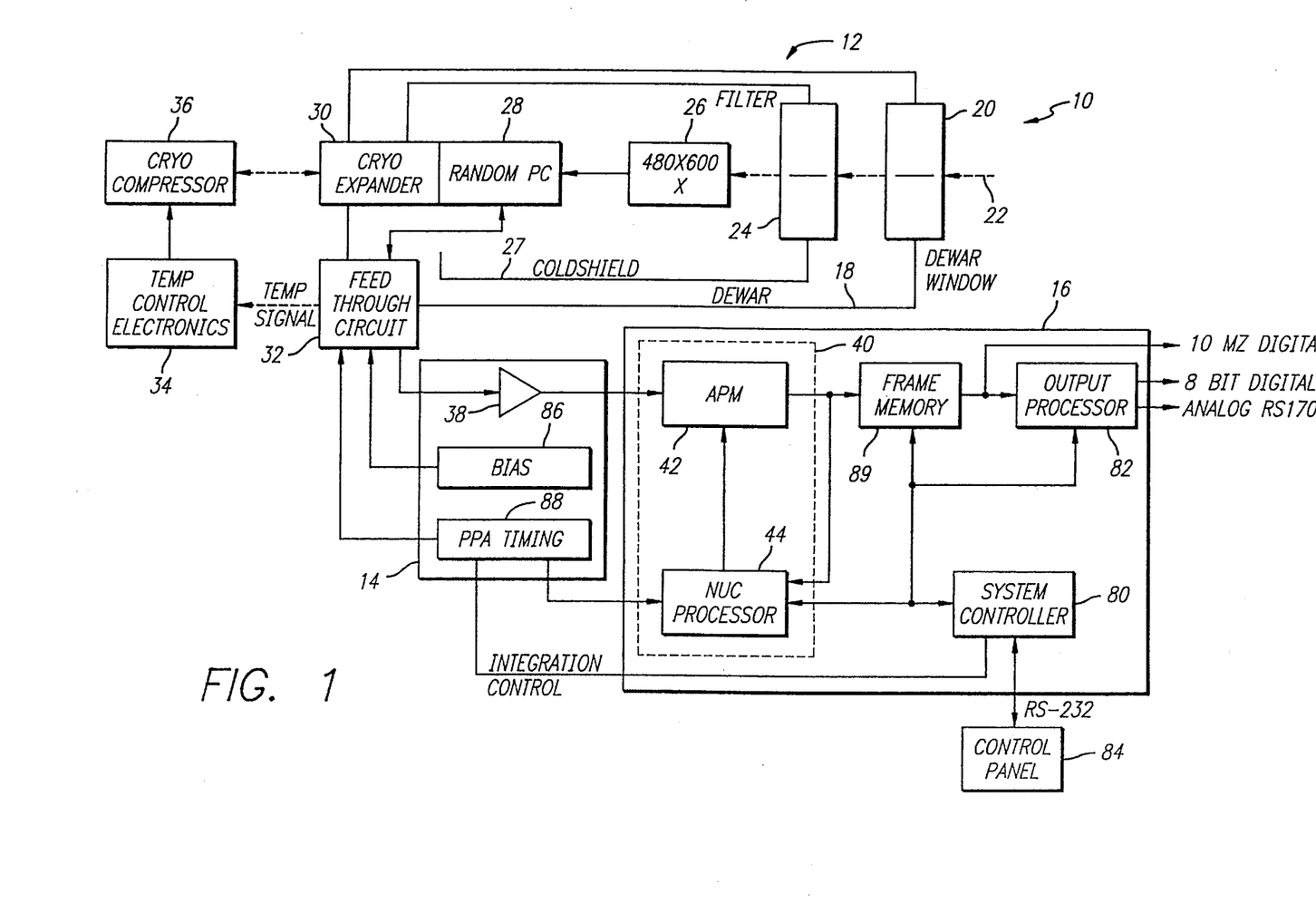
FIG. 1 is a block diagram of the key functional blocks of an imaging sensor constructed in accordance with the teachings of the present invention.
Figure 2A:
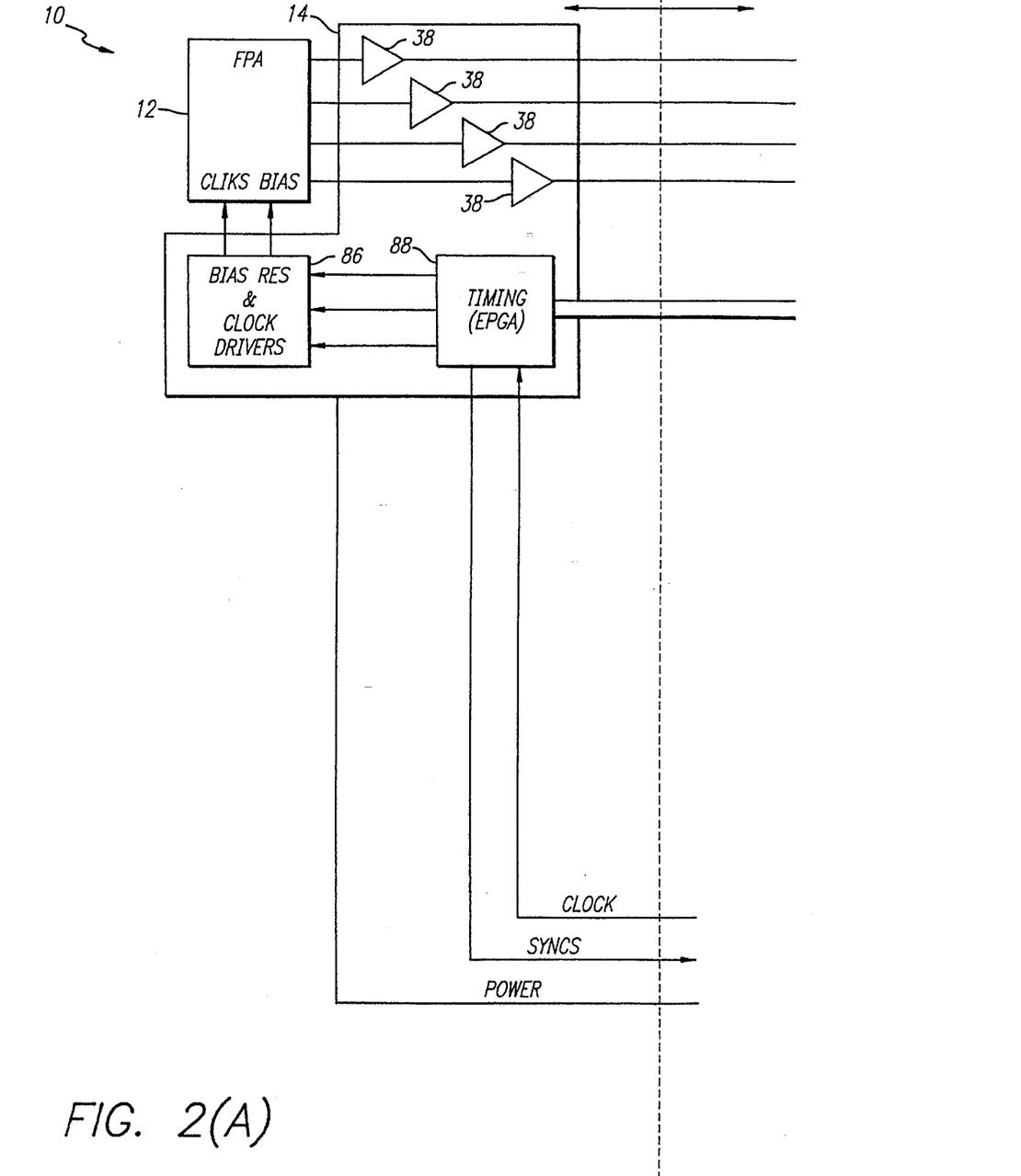
FIG. 2 is a more detailed block diagram of the imaging sensor of FIG. 1.
Figure 2B:
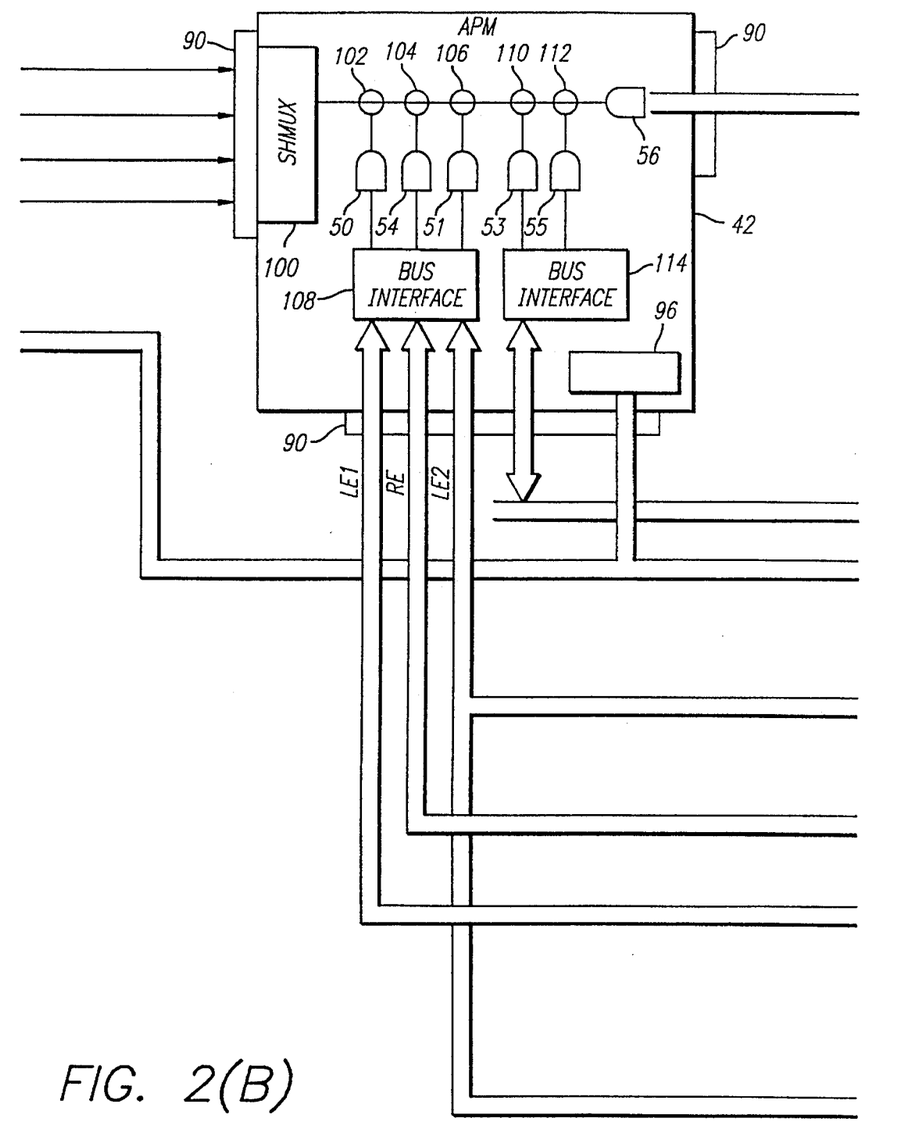
Figure 2C:
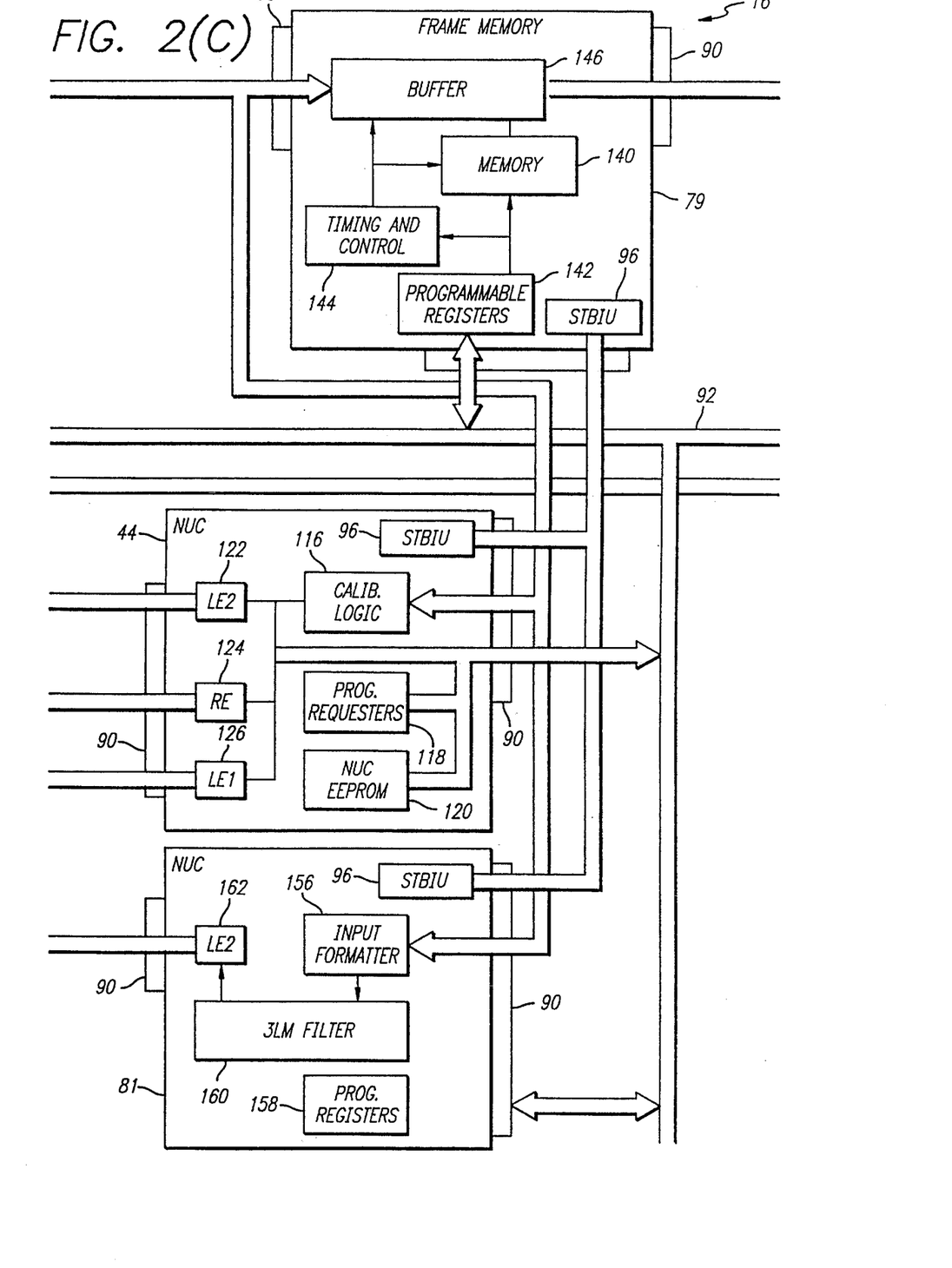
Figure 2D:
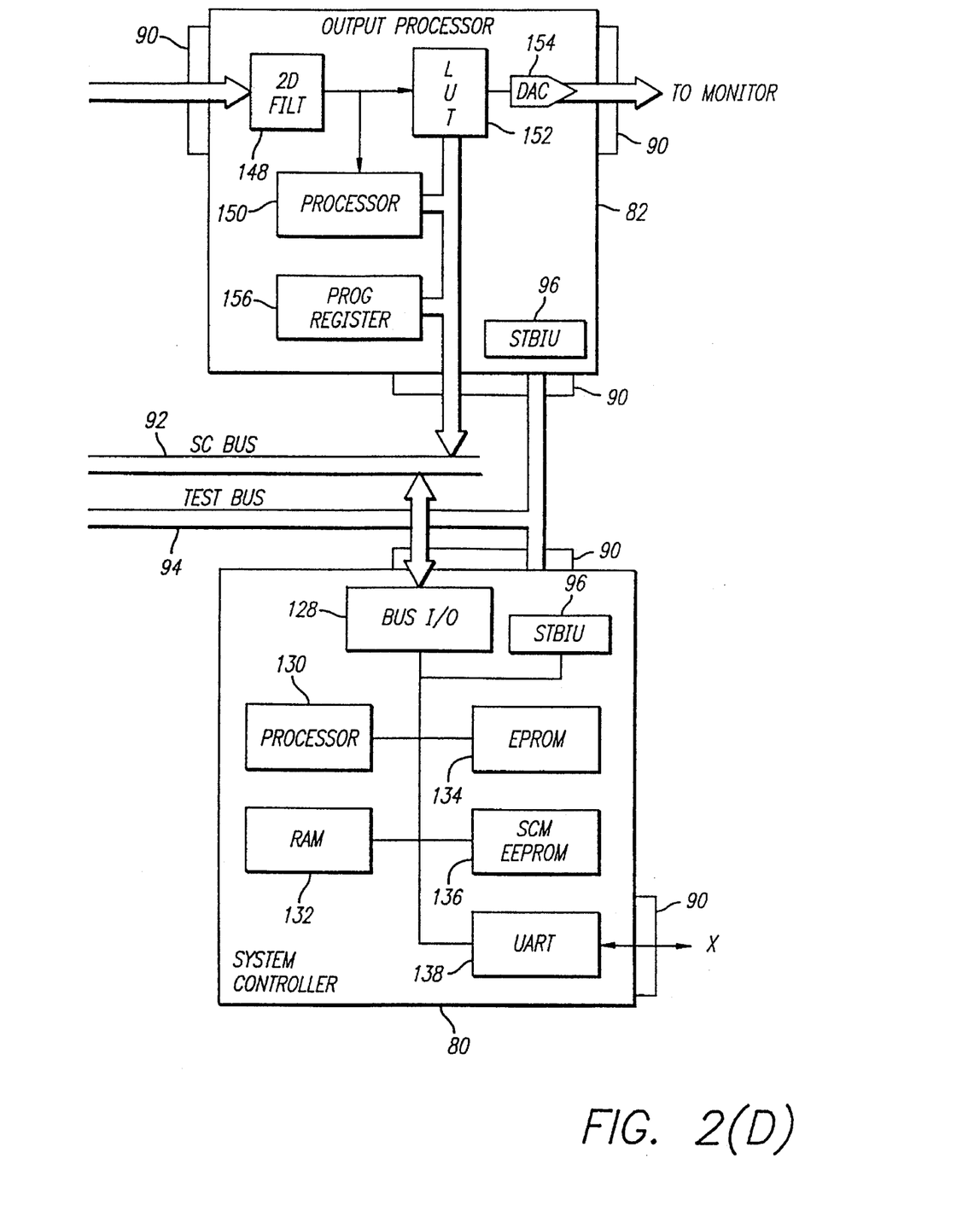

FIG. 1 is a block diagram of the key functional blocks of an imaging sensor constructed in accordance with the teachings of the present invention. The system 10 includes a focal plane array (FPA) 12, an FPA command and control electronics unit 14 and a signal processing unit 16. The focal plane array is used in a dewar 18 which has a dewar window 20. Incident electromagnetic energy 22 is filtered by a filter 24 an input to a detector 26 mounted within a coldshield 27. In the preferred embodiment, the imaging sensor is implemented in accordance with the teachings of U.S. patent application Ser. No. 08/491,133, filed Jun. 16, 1995, by M. W. Pines, et al., entitled MULTISPECTRAL STARING SENSOR,(Atty. Docket No. PD 95194).

The output of the detector 26 is input to a readout integrated circuit (IC) 28 mounted on a cryo-expander 30. The output of the readout IC 28 is input to a feedthrough circuit 32 which feeds the signal to a temperature control electronics unit 34. The temperature control electronics unit 34 controls the cryo-compressor 36 which in turn passes compressed gas to the cryo-expander 30. Hence, the temperature control electronics unit 34 actively controls the temperature of the focal plane array 12 by controlling the power to the compressor 36.

The feedthrough circuit 32 provides a signal to the FPA command and control electronics unit 14 which is amplified by an amplifier 38 and input to the signal processing unit 16. Bias and timing for the FPA 12 are provided by a bias circuit 86 and a timing circuit 88, respectively, of the FPA command and control electronics unit 14 under control of a system controller 80 in the signal processing unit 16.

In addition, the FPA command and control electronics unit 14 provides buffered, differential video drivers for analog outputs to allow operation remotely from the signal processing unit 16. Additional features of the signal processing unit 16 include a frame memory 79, the system controller 80, an output processor 82, and a control panel 84.

FIG. 2 is a more detailed block diagram of the imaging sensor of FIG. 1. The signal processing unit (SPU) 16 contains the power, control and video processing functions for the system 10. As shown in FIG. 2, the signal processing unit 16 includes numerous modules: an analog processing module 42, a nonuniformity correction module 44, and the system controller module 80. In accordance with the present teachings, the novel architecture of the signal processing unit 16 allows for an inexpensive addition of optional modules such as a frame memory module 79, a scene based nonuniformity correction module 81 or an output processing module 82.

Analog signals from the focal plane array 12 are communicated to the analog signal processing module 42 of the signal processing unit 16 via buffer amplifier 38 in the command and control electronics unit 14 and a backplane connector 90. The backplane connector 90 is provided on each module. The connector 90 facilitates the connection of the system control bus 92 and a test bus 94 to each module. Each module includes a self test bus interface 96.

The four lines depicted in FIG. 2 are connected via the backplane connector 90 to a sample and hold multiplexer (SHMUX) 100 on the analog processing module 42.

The novel modular design of the signal processing architecture of the present invention is facilitated by the sample and hold multiplexer which simultaneously samples the four parallel inputs from the focal plane array and subsequently multiplexes those inputs onto a single analog path. The output of the SHMUX 100 is provided to a first analog summer 102 which sums a level equalization signal from the nonuniformity correction (NUC) module 44. The signal from the NUC 44 is received through the backplane connector 90, a bus interface unit 108 and a first digital to analog converter (DAC) 50. The output of the first summer 102 is adjusted for responsivity by a first multiplier 104. The first multiplier 104 receives a responsivity correction factor from the NUC 44 via the bus interface 108, and a second DAC 54. A second summer 106 sums the output of the first multiplier 104 with a second level equalization signal from the NUC 44 via the backplane connector 90, the bus interface unit 108 and a third DAC 51. Global level and responsivity equalization are provided from the system control module 80, the system control bus 92, the backplane connector 90, programmable registers 114 and fourth and fifth DACs 53 and 55. The output of the third DAC 53 is summed with the output of the second summer 106 by a third summer 110. The output of the third summer 110 is multiplied with the output of the fifth DAC 55 by a second multiplier 112. The output of the second multiplier 112 is input to a first analog to digital converter (ADC) 56. The output of the ADC 56 is provided to the NUC 44, an optional frame memory 79, and an optional scene base nonuniformity corrector 81 via the backplane connector 90.

The nonuniformity correction module 44 provides signal adjustment parameters to the analog signal processing module 42 for each of the detectors in the array 12 in the manner set forth more fully in U.S. patent application Ser. No. 08/491,134, filed Jun. 16, 1995, by D. Botti, et al., entitled APPARATUS AND METHODS OF CLOSED LOOP CALIBRATION OF INFRARED FOCAL PLANE, (Atty. Docket No. PD 95169). The NUC module 44 includes calibration logic 116, programmable registers 118 an electrically erasable programmable memory (EEPROM) 120, a first level equalization memory 122, a responsivity equalization memory 124 and a second level equalization memory 126. As the other modules in the system, the NUC communicates via backplane connector 90, system control bus 92 and test bus 94.

Along with the analog processing module 42 and the NUC module 44, the system control module 80 is a required module. The system control module 80 includes a bus input/output (I/O) unit 128, a processor 130, random access memory 132, erasable programmable memory (EPROM) 134, EEPROM 136 and a universal asynchronous receiver transmitter (UART) 138.

The system control module 80 provides control signals and configuration information to the modules in the system and to the timing circuit 88 of the command and control circuit 14 (See FIG. 1). The control signals and configuration information are communicated to each of the modules as required for a desired system configuration. The required control signals for a given configuration may be provided to the EPROM 134 or EEPROM 136 at the time of assembly. Changes in the configuration by the addition or removal of certain modules is accommodated by changes in the code stored in EPROM 134 or EEPROM 136.

The control signals are communicated via programmable registers on each module. Software running on the system control module provides the control signals to the programmable registers to reconfigure the system in response to the addition of modules thereto and/or changes in the requirements of the modules. Hence, any additional modules may be easily incorporated into the system without a costly redesign of same.

Optional add-on modules, for the purpose of illustration, include a frame memory module 79, an output processor module 82 and the scene based nonuniformity correction module 81. The frame memory 79 may be added for those applications requiring some image processing capabilities such as image stabilization, electronic, zoom image inversion, reversion and etc. The scene based nonuniformity corrector 81 provides additional image processing capability. The output processor module 82 would be required for those applications requiring a display of the detected image. The frame memory 79 includes a random access memory 140, programmable registers 142, timing and control circuitry 144 and a buffer 146. The scene based nonuniformity corrector 81 includes an input formatter 156, programmable registers 158, a 3LM (three level median) filter 160 and a second level equalization memory 162. The output processor 82 includes a two dimensional filter 148, a histogram memory 150, a lookup table 152 and a DAC 154.

Figure 3:
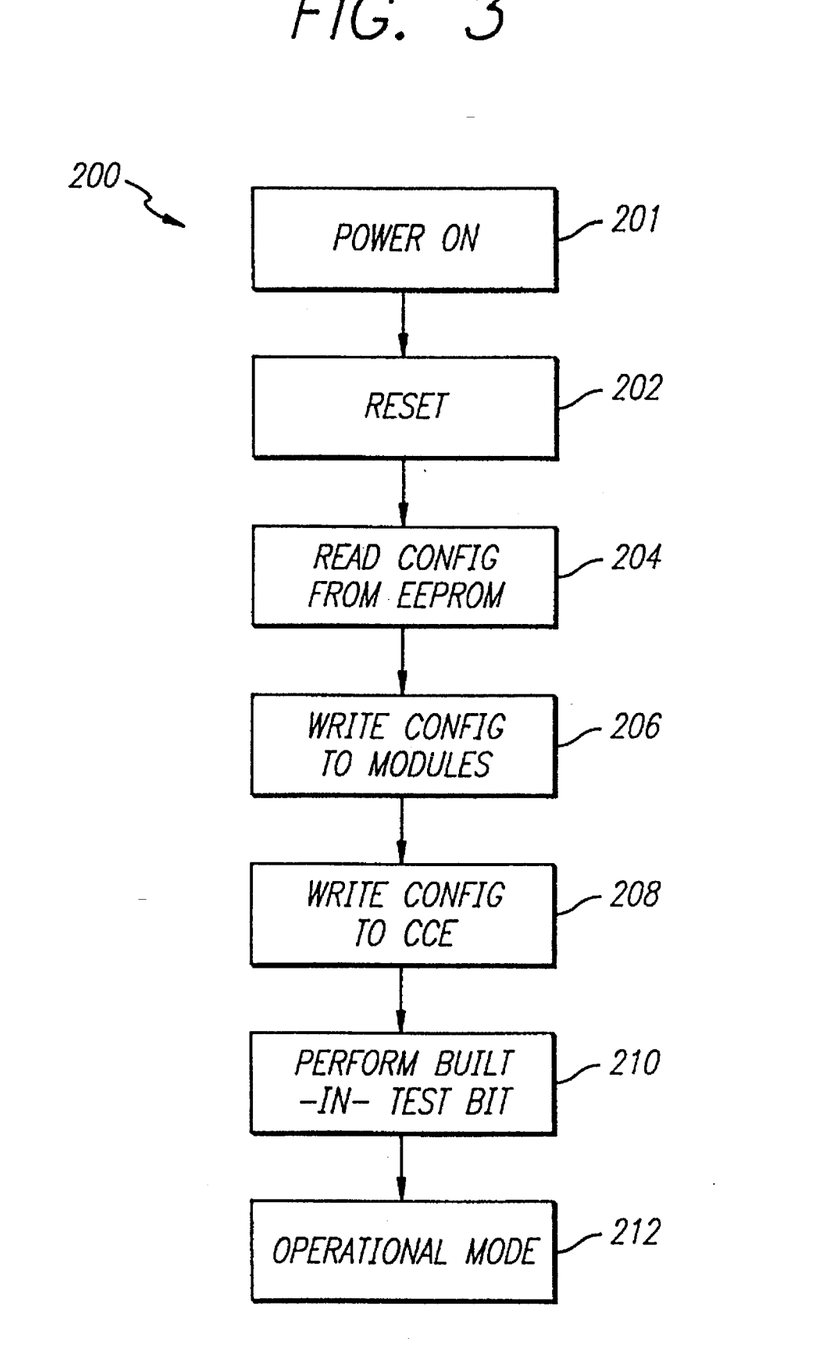
FIG. 3 is a flow diagram of illustrative initialization software utilized by the system control module of the signal processing system of the present invention.

FIG. 3 is a flow diagram of illustrative initialization software utilized by the system control module of the signal processing system of the present invention. The routine 200 begins with power on (step 201) and reset (step 202). Next, configuration data is read from the EEPROM 136 (step 204). At step 206 configuration data is written to programmable registers of the appropriate modules. At step 208, integration time data for the focal plane array is written to the timing circuit 188 of the command and control unit 14. At step 210, built-in-test operations are performed. At step 212, the routine 200 goes into operational mode.

Figure 4:
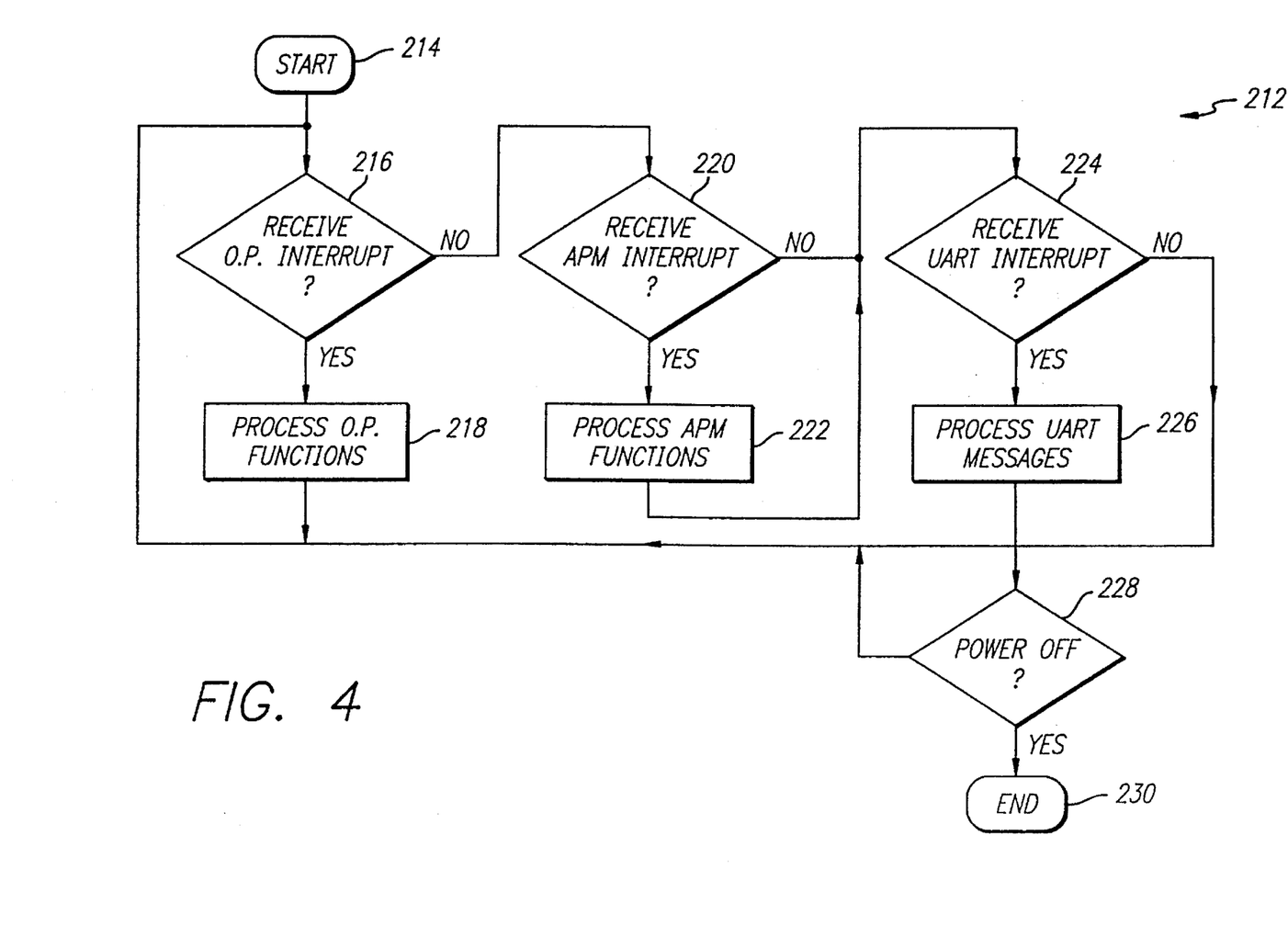
FIG. 4 is a flow diagram of an illustrative implementation of the operation mode software.

FIG. 4 is a flow diagram of an illustrative implementation of the operation mode software. At step 214, the system starts. The system goes into a standby mode waiting for interrupts from the output processor (step 216), the analog processing module (step 220) or the UART (step 224) and processes output functions (step 218), APM functions (step 222) and UART messages (step 226) respectively. The software terminates when the signal processing unit is powered off.

As additional modules are added, the software will wait for interrupts from such modules and process the interrupts accordingly.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A modular signal processing system for a focal plane array of detectors comprising:

an analog signal processing module for adjusting signals from the focal plane array;

a nonuniformity correction module for providing signal adjustment parameters to the analog signal processing module for the outputs of one or more detectors in the focal plane array;

a system control module for providing system control signals to one or more of the modules in the system; and means for communicating the system control signals to each of the modules, the means for communicating including a programmable register on each module for receiving and storing the control signals.

2. The invention of claim 1 further including software disposed on the system control module for providing system control signals to memory means disposed on modules connected to the system to reconfigure the system in response to the addition of modules to the system.

3. The invention of claim 1 wherein the communicating means includes a backplane and each of the modules includes a backplane connector for coupling each of the modules to a common bus.

4. The invention of claim 3 further including a scene based nonuniformity correction module electrically connected to the backplane for providing signal adjustment parameters to the analog signal processing module for the outputs of one or more detectors in the focal plane array in response to energy received from a scene.

5. The invention of claim 1 wherein the analog processing module includes multiplexing means for simultaneously sampling a plurality of parallel inputs from the focal plane array and subsequently multiplexing the inputs onto a single analog path.

6. The invention of claim 5 wherein the multiplexing means includes a sample and hold multiplexer.

7. The invention of claim 1 further including command and control electronics means for interfacing the focal plane array to the signal processing system.

8. A modular signal processing system for a focal plane array of detectors comprising:

an analog signal processing module for adjusting signals from the focal plane array;

a nonuniformity correction module for providing signal adjustment parameters to the analog signal processing module for the outputs of one or more detectors in the focal plane array;

a system control module for providing system control signals to one or more of the modules in the system; and means for communicating the system control signals to each of the modules, said communicating means including:
  a backplane and each of the modules including a backplane connector for coupling each of the modules to a common bus and
  a frame memory module electrically connected to the backplane for storing and reformatting signals output by the analog processing module.

9. The invention of claim 8 further including an output processing module electrically connected to the backplane for outputting and processing signals from the frame memory module.

10. The invention of claim 8 wherein the means for communicating includes memory means on each module for receiving and storing the control signals.

11. The invention of claim 10 further including software disposed on the system control module for providing system control signals to memory means disposed on modules connected to the system to reconfigure the system in response to the addition of modules to the system.

12. The invention of claim 8 further including a scene based nonuniformity correction module electrically connected to the backplane for providing signal adjustment parameters to the analog signal processing module for the outputs of one or more detectors in the focal plane array in response to energy received from a scene.

13. The invention of claim 8 wherein the analog processing module includes multiplexing means for simultaneously sampling a plurality of parallel inputs from the focal plane array and subsequently multiplexing the inputs onto a single analog path.

14. The invention of claim 13 wherein the multiplexing means includes a sample and hold multiplexer.

15. The invention of claim 8 further including command and control electronics means for interfacing the focal plane array to the signal processing system.

16. A modular signal processing system for a focal plane array of detectors comprising:

an analog signal processing module for adjusting signals from the focal plane array;

a nonuniformity correction module for providing signal adjustment parameters to the analog signal processing module for the outputs of one or more detectors in the focal plane array;

a system control module for providing system control signals to one or more of the modules in the system; and means for communicating the system control signals to each of the modules, said communicating means including:
  a programmable register on each module for receiving and storing the control signals,
  a backplane and each of the modules including a backplane connector for coupling each of the modules to a common bus, and
  a frame memory module electrically connected to the backplane for storing and reformatting signals output by the analog processing module.

17. The invention of claim 16 further including an output processing module electrically connected to the backplane for outputting and processing signals from the frame memory.

18. The invention of claim 16 wherein the analog processing module includes multiplexing means for simultaneously sampling a plurality of parallel inputs from the focal plane array and subsequently multiplexing the inputs onto a single analog path, said multiplexing means including a sample and hold multiplexer.

* * * * *